United States Patent [19]

Odawara et al.

[11] Patent Number: 5,584,041

[45] Date of Patent: Dec. 10, 1996

[54] CHANNEL APPARATUS HAVING A PLURALITY OF CHANNELS CAPABLE OF BEING OPERATED EITHER IN PARALLEL MODE OR IN SEPARATE MODE

[75] Inventors: Hiroaki Odawara, Kokubunji; Tetsuji Ogawa, Hadano, both of Japan

[73] Assignee: Hitachi, Ltd., Tokyo, Japan

[21] Appl. No.: 121,895

[22] Filed: Sep. 16, 1993

[30] Foreign Application Priority Data

Sep. 18, 1992 [JP] Japan .................................. 4-249188

[51] Int. Cl.⁶ .................................................. G06F 15/02
[52] U.S. Cl. ...................... 395/834; 395/841; 364/232.9; 364/246.3; 364/246.7; 364/251.3
[58] Field of Search ..................... 395/275, 425, 395/725, 250, 834, 841, 800

[56] References Cited

U.S. PATENT DOCUMENTS

| | | | |
|---|---|---|---|
| 4,646,324 | 2/1987 | Albano et al. | 370/18 |
| 4,788,638 | 11/1988 | Ogawa | 395/250 |
| 4,868,784 | 9/1989 | Marshall et al. | 395/310 |
| 5,111,425 | 5/1992 | Takeuchi et al. | 395/842 |
| 5,182,800 | 1/1993 | Farrell et al. | 395/844 |
| 5,231,649 | 7/1993 | Duncanson | 370/84 |
| 5,369,747 | 11/1994 | Muranoi | 395/250 |
| 5,386,532 | 1/1995 | Sodos | 395/842 |
| 5,390,262 | 2/1995 | Pope | 382/234 |

FOREIGN PATENT DOCUMENTS 2667464 4/1992 France .
64-7243 1/1989 Japan .
3-58156 3/1991 Japan .

OTHER PUBLICATIONS

"Enterprise Systems Architecture 390 ESCON I/O Interface (SA 22-7202)", pp. 3-2, 3-3, 6-6, published by IBM.
"IBM ESA/390 Principles of operation (SA-7201)", pp. 14-13, 14-14, 15-25, published by IBM.

Primary Examiner—Thomas C. Lee
Assistant Examiner—Moustafa Mohamed Meky
Attorney, Agent, or Firm—Antonelli, Terry, Stout & Kraus

[57] ABSTRACT

A channel processor (CHP) within a channel apparatus instructs parallel transfer of data through a plurality of channels within a channel cluster (CCL), when it reads out a LCUW. Each of the channels sequentially generates addresses of a main storage determined based on numbers of respective channels under control of a control section and a channel data controller (CDC) accesses the main storage according to the generated addresses to read out data. Those channels transfer the data in parallel to an auxiliary storage device through an optical fiber cable set. This auxiliary storage device includes a plurality of channel ports, two buffer control circuits, a buffer and a high speed storage unit. The buffer has a two-face structure, each of the faces having 2 kilo-bytes. One of the buffer control circuits receives data from the channel ports through the optical fiber cable set in the plurality of channels and selects either one of the faces of the buffer to write them therein. As soon as all the received data are written in either one of the faces of the buffer, they are read out by the other of the buffer control circuits to be written in the high speed storage unit.

14 Claims, 8 Drawing Sheets

CHANNEL APPARATUS HAVING A PLURALITY OF CHANNELS CAPABLE OF BEING OPERATED EITHER IN PARALLEL MODE OR IN SEPARATE MODE

BACKGROUND OF THE INVENTION

The present invention relates to a channel apparatus used in a data processing system, and in particular to a channel apparatus for improving the data transfer speed between a main storage and an I/O device, as well as a computer system using it.

FIG. 1 shows the construction of a conventional channel apparatus (which may be called an I/O device in a broad sense). In the figure, a channel apparatus (IOP) 6 consists of a channel processor (CHP) 20 and a channel cluster (CCL) 24. The CHP 20 interfaces with a central processing unit (CPU) 2 through a line 100 and with a main storage (MS) 4 through a line 101. The CCL 24 interfaces with I/O devices 8-0 to 8-7. The CCL 24 has 8 channels CH0–CH7. Since the different channels have the same construction, only the construction of the channel CH0 is indicated in FIG. 1 in detail and details of the construction of the other channels CH1–CH7 are omitted therein. Hereinbelow the channel CH0 will be explained.

The channel CH0 communicates with the CHP 20 through a line 200. A control section 50 executes a microprogram (μP) to control the operation of the channel CH0 and to start a transfer control section 70. In this way data transfer is started. The control section 50 sets a transfer count in a transfer counter 60 through a line 210 in units of bytes. When transfer is terminated, the transfer control section 70 informs the control section 50 of the termination. Data is transferred between an I/O device 8 and the MS 4 through a data buffer (CBS) 30. Data transfer between the CBS 30 and the MS 4 is effected in units of a block, one data block consisting of 32 bytes. The address of a data block to be transferred on the MS 4 is held by a block address register (BAR) 27. The initial value of the BAR 27 is set by the control section 50 through a line 220. The address held by the BAR 20 is incremented by 1 by an adder 40, every time one data block is transferred. The BAR 27 holds the upper 26 bits as a block address obtained by excluding the least significant 5 bits from the 31 bits of an address for addressing a data block on the MS 4. Consequently the adder 40 adds "1" to the least significant bit of a block address held by the BAR 27. A serial/parallel converting circuit 80 and an opto-electric converting circuit 81 are disposed between the CBS 30 and the I/O device 8. Data is transferred through an optical fiber cable 300 in bit serial form through the serial/parallel converting circuit 80 and opto-electric converting circuit 81. The frame of data transferred through the optical fiber cable 300 is described in, for example, "Enterprise Systems Architecture/390 ESCON I/O Interface (SA22-7202)" pp. 3-2~3-3, 6-6, published by IBM Corporation in the US. In the I/O device 8 there are disposed a channel port 61 and a storage unit 63. The channel port 61 is connected with the optical fiber cable 300 and transfers data between the channel apparatus and the I/O device.

The throughput requirement of an I/O device, e.g., an auxiliary storage device, connected with the channel apparatus increases every year. In contrast to the fact that the throughput of a channel widely utilized in practice for a large scale general purpose computer is at most 17 MB/s, a throughput greater than 100 MB/s is made possible in an auxiliary storage device called a disk array in which disk drives are disposed in parallel to transfer data in parallel. Further, LANs (Local Area Network) having a data transfer speed of an order of 1 Gbps are now available on the market. An HIPPI (High Performance Parallel Interface) channel based on the ANSI standards can be cited as a means for connecting such a high speed I/O device with a large scale computer. On the other hand, taking compatibility with a conventional device into account, there would be considered a channel apparatus in which only the transfer speed is increased with little modification of the above conventional channel interface. However, this approach requires use of high speed optical modules in a transmitter-receiver system for a channel in order to increase the transfer speed, using the serial transfer system as it is, which gives rise in many cases to a problem that the cost therefor is extremely increased. Further, it was necessary to change the control clock for each of the transmitter-receiver systems in the conventional device, which gives rise to a problem that the amount of change in design will be great.

As a method for solving these problems it has been proposed to dispose a plurality of channels in parallel, which channels are operated simultaneously, as described in JP-A-64-7243 and JP-A-3-58156. JP-A-64-7243 discloses a computer having channels and a main storage of interleave structure, in which computer the channels and banks of the main storage are directly connected through a dedicated parallel channel control device so that data can be transferred in parallel between the main storage and the channels. However this method can not always be used in a computer in which a secondary cache is provided between the channels and the main storage. Further, since in general a main storage device and a secondary cache device have a throughput which is extremely greater than that of a channel, it is necessary to be conscious of the need for the interleave structure to small in at most several channels disposed in parallel. In JP-A-3-58156 a plurality of channels are arranged in parallel in units of bytes and a request is issued in units of bytes. In a computer system, in which a request is issued to the main storage device in a unit of a value greater than 1 byte, e.g., 32 bytes, even when a structure of parallel channels is employed, it requires an extremely great amount of change in hardware to enable a request to be issued in units of bytes.

SUMMARY OF THE INVENTION

The object of the present invention is to provide a channel apparatus having a high throughput and a relatively simple structure regardless of using serial channels, even in a computer system having a main storage device including a secondary cache or having an arbitrary interleave structure.

In order to achieve the above object, according to the present invention, data is transferred in parallel so as to realize a high speed by operating a plurality of serial channels in parallel in units of data sets.

A method of transferring data between a main storing device and an I/O device through a channel apparatus disposed therebetween, the channel apparatus having a plurality of channels connected in parallel with the I/O device, the main storing device being accessed in units of data blocks including a predetermined number of bytes, comprises the steps of determining a number of data blocks to be transferred through each of the channels in units of data sets in response to an input/output order, the data set including a predetermined number of data blocks; determining addresses for the main storing device, starting from the input/output order, the number of data blocks thus determined, and a predetermined number of data blocks for the data set; and transferring data in parallel between the main storing device and the I/O device in units of data sets, using the determined addresses for the main storing device.

DESCRIPTION OF THE PREFERRED EMBODIMENTS

Hereinbelow, referring to the attached drawings, a channel apparatus according to the present invention and a computer system using it will be explained in detail.

Figure 1:
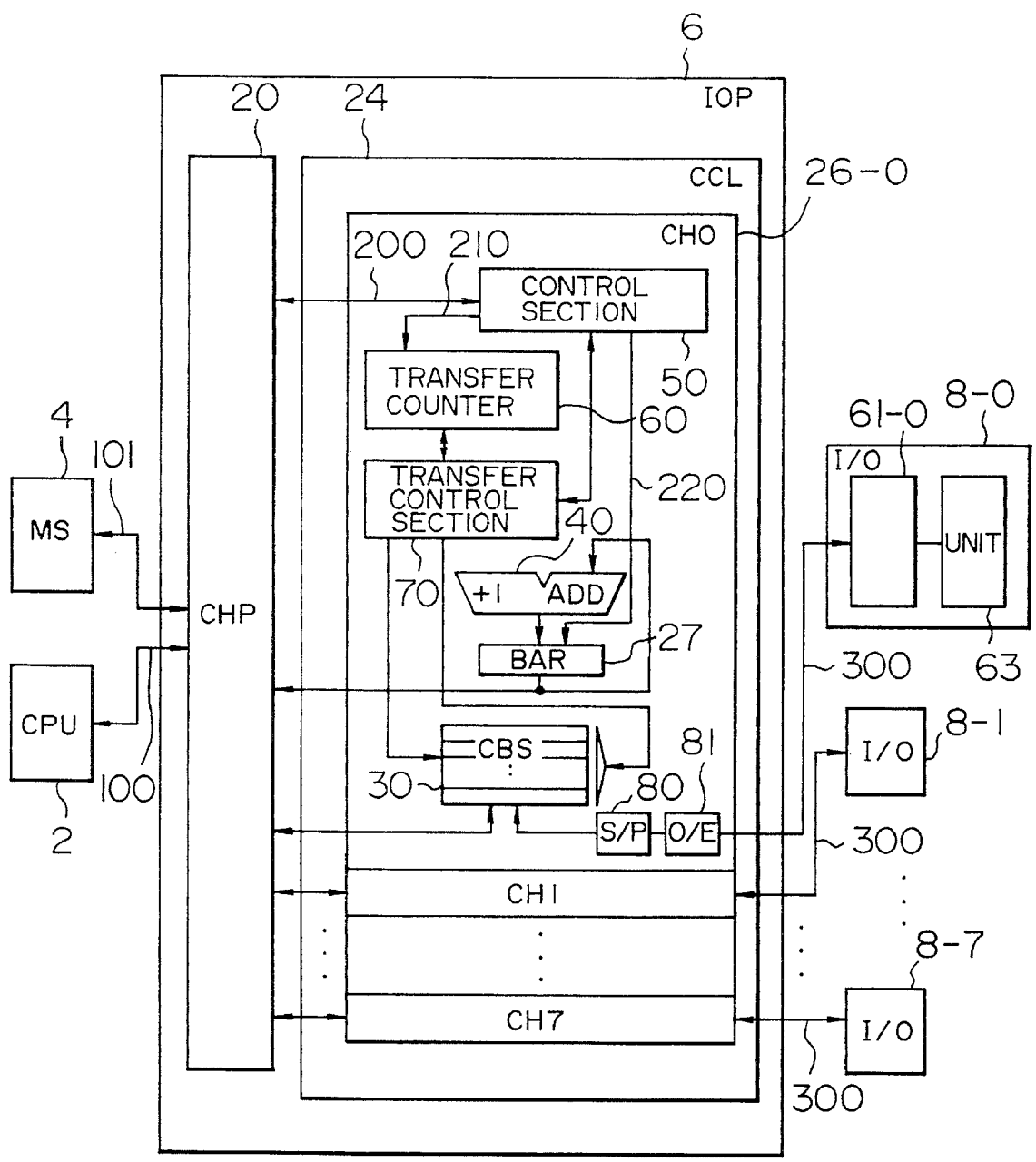
FIG. 1 is a diagram showing an outlined construction of a conventional channel apparatus.
Figure 2:
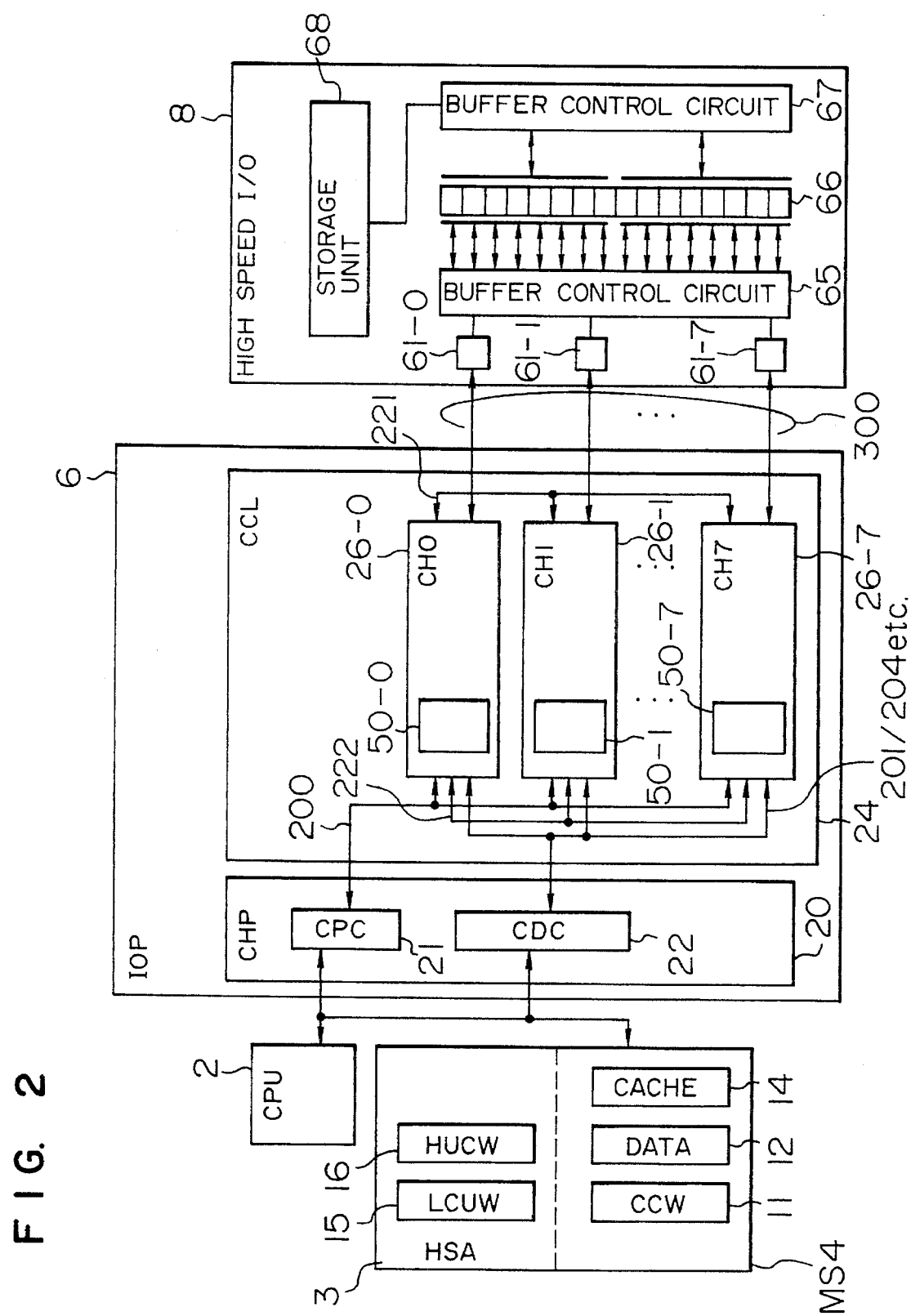
FIG. 2 is a diagram showing an outlined construction of an embodiment of the present invention.

Referring to FIG. 2, the computer system includes a CPU 2, a main storage device (MS) 4, a channel apparatus 6, an optical fiber cable set 300, and a high speed I/O device 8. The CPU 2 executes a user program and issues an SSCH (start subchannel) instruction in response to an operating system or an interrupt. The MS 4 has an area for storing data, and a hardware system area (HSA) 3. A channel command word (CCW) or chained CCWs 11 and data 12 to be transferred are stored in the storing area. The transfer data is accessed in units of 32 bytes. When the MS 4 is accessed, both the CCW 11 and the data 12 are inputted/outputted through a cache 14. Logical control unit words (LCUWs) 15 and a HSA unit control word (HUCW) queue 16 are disposed in the HSA 3.

Figure 5:
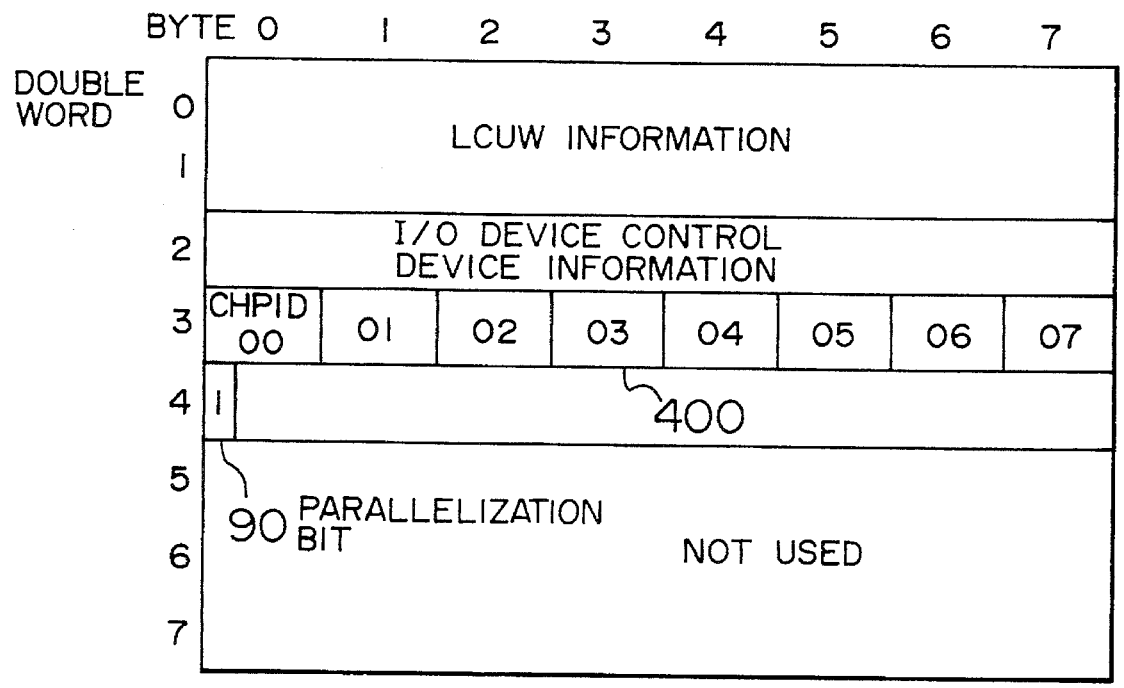
FIG. 5 shows the format of LCUW used in the embodiment.

FIG. 5 shows the format of the LCUW. The LCUW 15 is a table prepared for each peripheral or I/O device which is connected with the computer system and information of connection with the computer system is registered therein. Particularly channel path numbers (CHPID) 400 indicative of channels capable of accessing the peripheral device are specified in the LCUW 15. According to the present invention, there is disposed a parallelization bit 90 representing that the channels having these specified CHPIDs are parallelized. When the parallelization bit 90 is "1", the channel apparatus works in the parallel mode and the channels having the CHPIDs specified in the LCUW are parallelized, while when the parallelization bit 90 is "0", the apparatus works in the separate mode and they are not parallelized. The parallelization bit 90 is set by a user at the same time as configuration information is set, when a peripheral device corresponding to the LCUW is connected physically to the computer system. As described later, a CPC 21 can refer to the LCUW 15 on the HSA 3 through the line 200. I/O instructions issued by the CPU 2 are sequentially registered in the HUCW queue 16.

Figure 4:
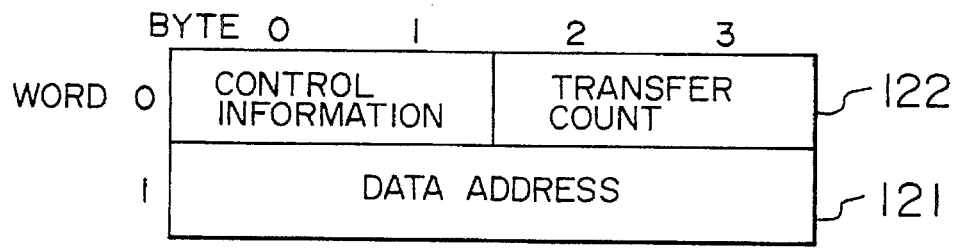
FIG. 4 shows the format of CCW.

FIG. 4 shows the format of the CCW. A data address 121 of 4 bytes indicating the start address of the transfer data on the MS 4 and a transfer count 122 of 2 bytes indicating the transfer data length in units of bytes are set in the CCW. Further data indicating whether the CCW is chained with the succeeding CCW or not are set in control information of 2 bytes.

Figure 6:
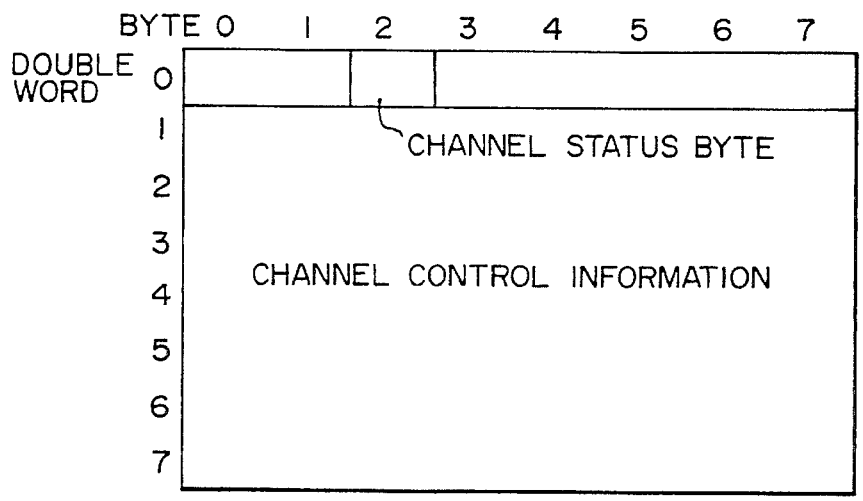
FIG. 6 shows channel control information within CPC indicated in FIG. 2.

In FIG. 2, the channel apparatus (IOP) 6 includes a channel processor (CHP) 20 and a channel cluster (CCL) 24. The CHP 20 includes a channel process controller (CPC) 21 and a channel data controller (CDC) 22. The CPC 21 supervises the HUCW queue 16 and when detecting an I/O instruction, reads the LCUW corresponding to the instruction. In this way channels which should be made active are determined to be started. The CPC 21 has channel control information indicated in FIG. 6 therein and can know what channel is busy by referring thereto. Responding to an access instruction from each of the channels, the CDC 22 stores data from the channel in the area 12 of the MS 4 or stores data on the MS 4 in the channel, based on an address from the channel. The CCL 24 includes 8 channels CH0–CH7 26-i (i=0 to 7) corresponding to CHPID00–07, respectively. In the parallel mode of the present embodiment, the 8 channels CH0–CH7 are parallelized. Among them the channel CH0 is the representative channel. These channels are connected with each other through lines 222 and 221.

The high speed auxiliary storage I/O device 8 includes a plurality of channel ports 61-i (i=0 to 7), 2 buffer control circuits 65, 67, a buffer 66 and a high speed storage unit 68. The buffer has a two-face structure having a data area of 2 kilo-bytes (KB) on every face. The buffer control circuit 65 receives divided data transferred from the plurality of channels through the optical fiber cable set 300 and the channel ports 61-i and selects either one of the 2 faces of the buffer 66 to write the received data therein. As soon as all the divided data of 2 KB are written in either one of the faces of the buffer 66, they are read out by the buffer control circuit 67 to be written in the storage unit 68. In the case of read processing, on the other hand, when the buffer control circuit 67 reads out data of 2 KB from the storage unit 68 and writes on one of the faces of the buffer 66, the buffer control circuit 65 divides the data stored in the buffer so as to transfer 256 by 256 bytes to each of the channel ports. For reading and writing operations between the storage unit 68 and the buffer 66, measures such as increased data width are taken so that the throughput is greater than "throughput of one channel×total number of parallelized channels", i.e. that the throughput on the unit 68 side causes no bottleneck with respect to the throughput on the channel side. If the throughput on the unit 68 side gives rise to no problem, since the buffer 66 has a two-face structure, reading-out/writing-in of data by the buffer control circuits 65, 67 can be effected successively. Further the auxiliary storage device 8 has a control unit (not indicated in the figure), which decodes instructions sent as data and controls the operation of the whole device 8 according to results thus obtained.

Figure 7:
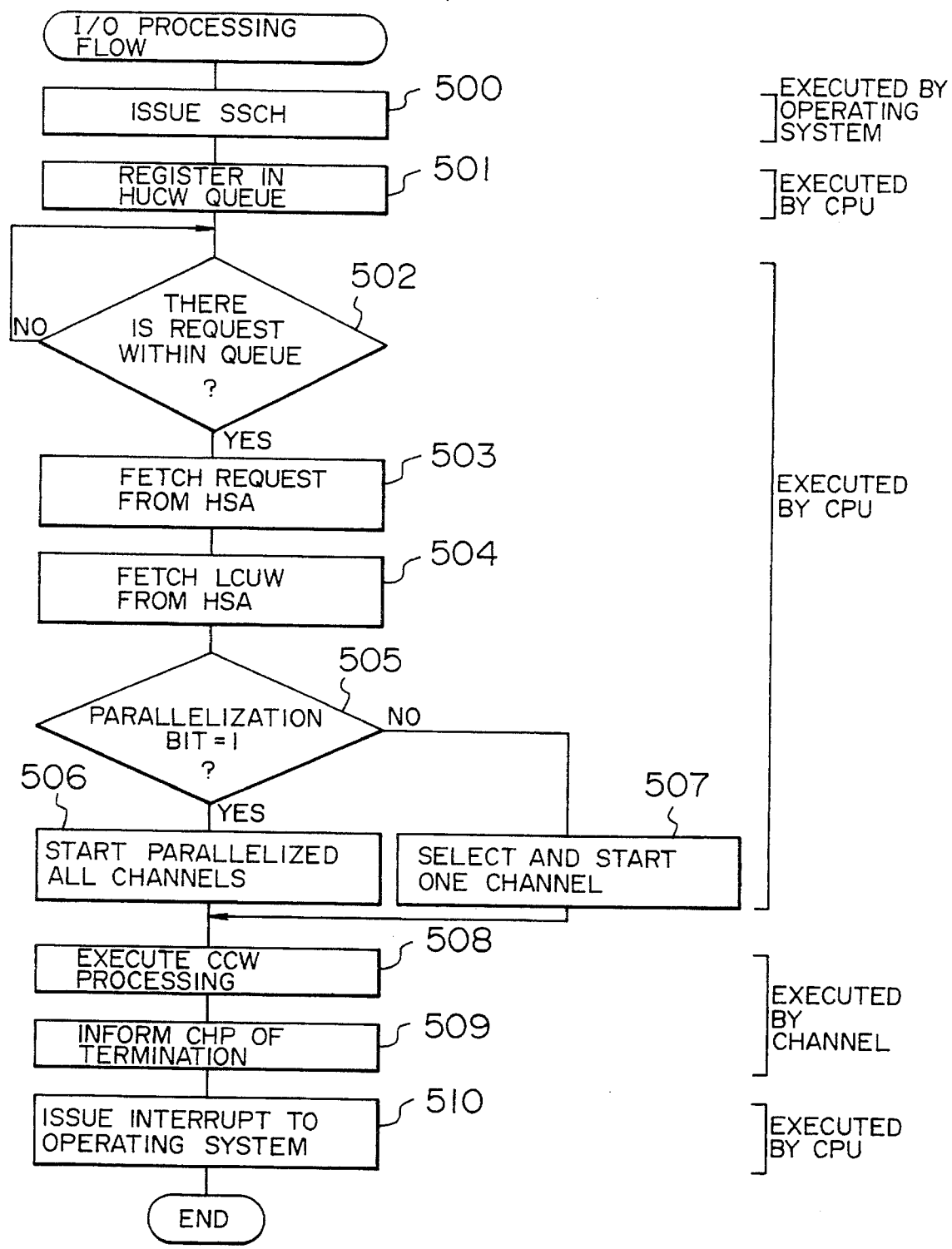
FIG. 7 is a flow chart indicating the outline of input/output processing used in the embodiment.

Next, referring to FIGS. 2 and 7, the operation of this embodiment of the present invention will be explained.

When the high speed I/O device 8 demanding parallel data transfer is connected with the channel apparatus 6, the CPU 2 sets "1" as a parallelization flag in a field 90 of the LCUW in accordance with the designation of a user. Also, the CPU 2 sets channel path numbers CHPID00–07 as connection information indicating that the I/O device 8 is connected with CH00–07.

Figure 3:
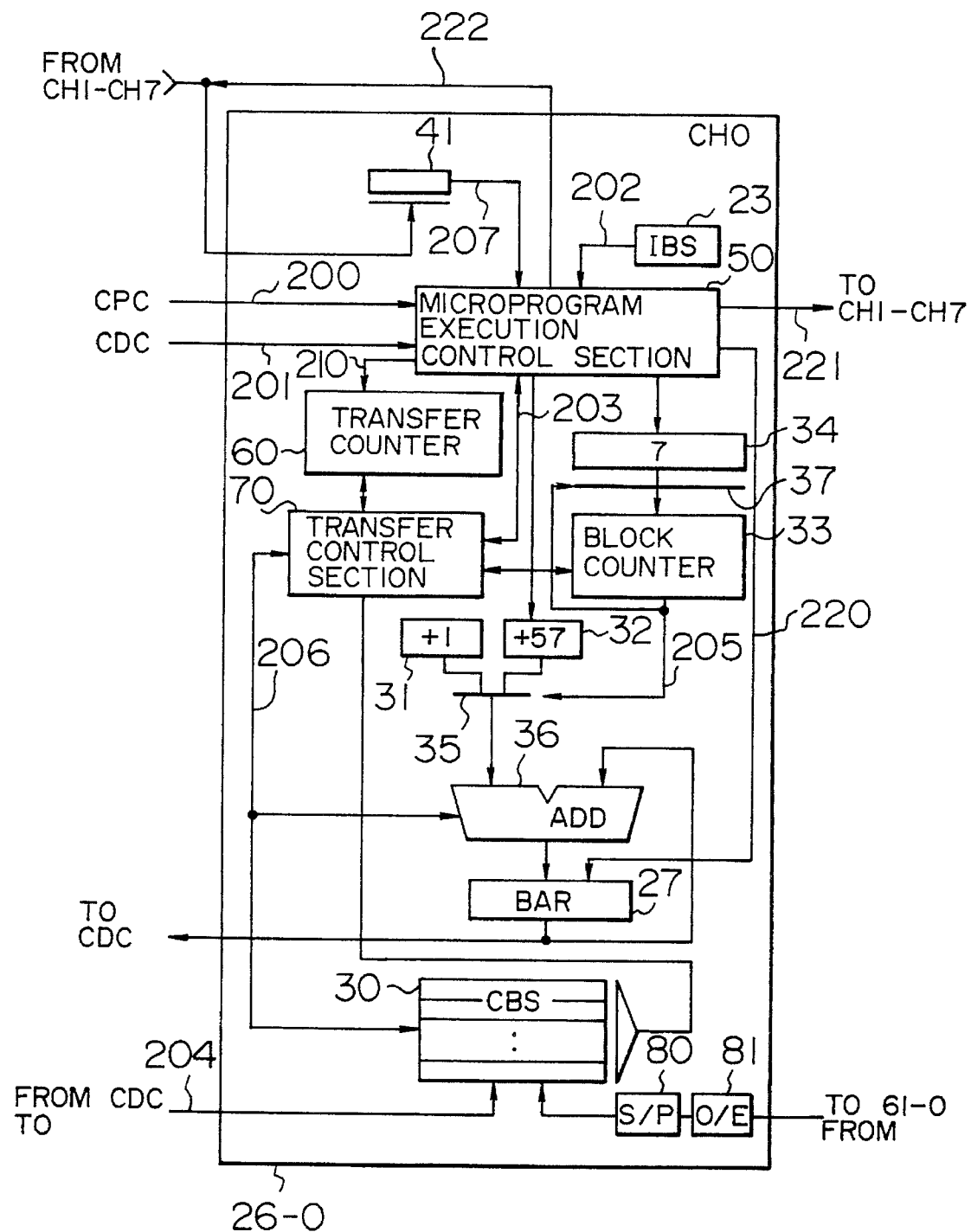
FIG. 3 is a diagram showing a channel indicated in FIG. 2 in detail.

When the system is powered-on, a channel number is stored in a memory (IBS) 23 within each of the channels as shown in FIG. 3 by the CPC 21 so that the control section 50 of every channel can refer to its own channel number through a line 202. Concretely speaking, the channel number is so set that it is "0" for the channel CH0, "1" for the channel CH1, "2" for the channel CH2, and so forth.

When an SSCH (START SUBCHANNEL) instruction is issued by an operating system (Step 500) while the CPU executes a user program, the CPU 2 registers an I/O request in the HUCW queue 16 within the HSA 3 on the MS 4 (Step 501). The CPC 21 monitors the HUCW queue 16 with a predetermined time interval (Step 502). When it is detected that the I/O request is registered in the HUCW queue 16, the CPU21 fetches the request from the HUCW queue (Step 503), and then fetches the LCUW corresponding to the request from the HSA 3 (Step 504). Next a field 90 within the LCUW is referred to (Step 505) and it is examined whether the parallelization flag is set or not. Further, the connection information is also examined. If the flag is set and CHPID00–07 are designated, all the channels are started in parallel or are made active (Step 506). If the flag is not set, a channel not busy at that time is selected from among the channels designated by the connection information within the LCUW based on a channel status byte of a channel control word indicated in FIG. 6 and is started or made active (Step 507). The origin (start address) of CCWs to be executed by the started channel is originally placed in an operation request block (ORB) which the SSCH instruction specifies. When the SSCH instruction is executed, the CPU 2 copies the origin into the HUCW of the specified I/O device. The CPC 21 reads the origin from the HUCW and sends it to the started channel through a predetermined area in the HSA.

Next the operation in the parallel mode when the parallelization bit is set will be explained.

Figure 8:
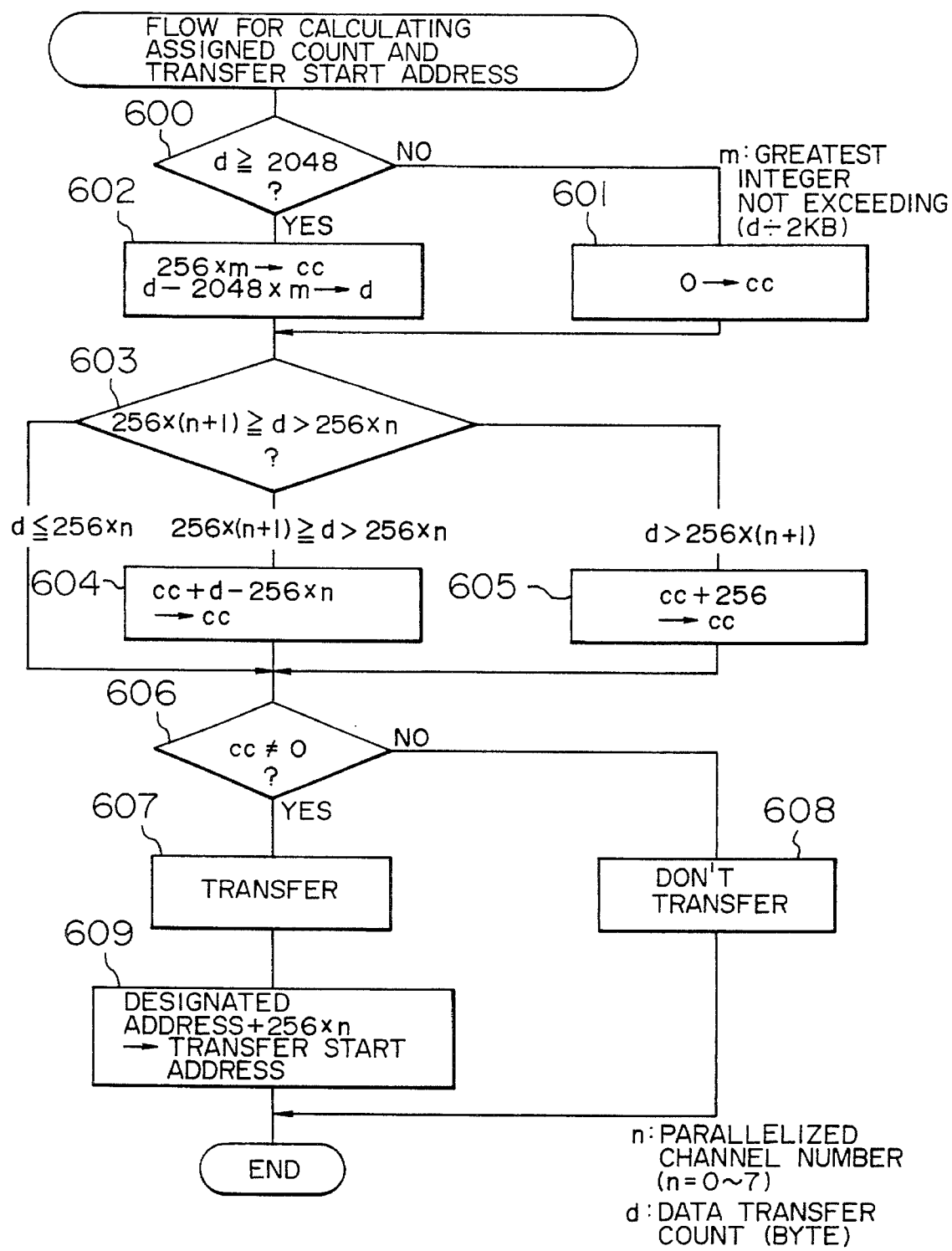
FIG. 8 is a flow chart indicating an operation for calculating an assigning transfer count and a transfer start address in each of channels arranged in parallel.
Figure 10:
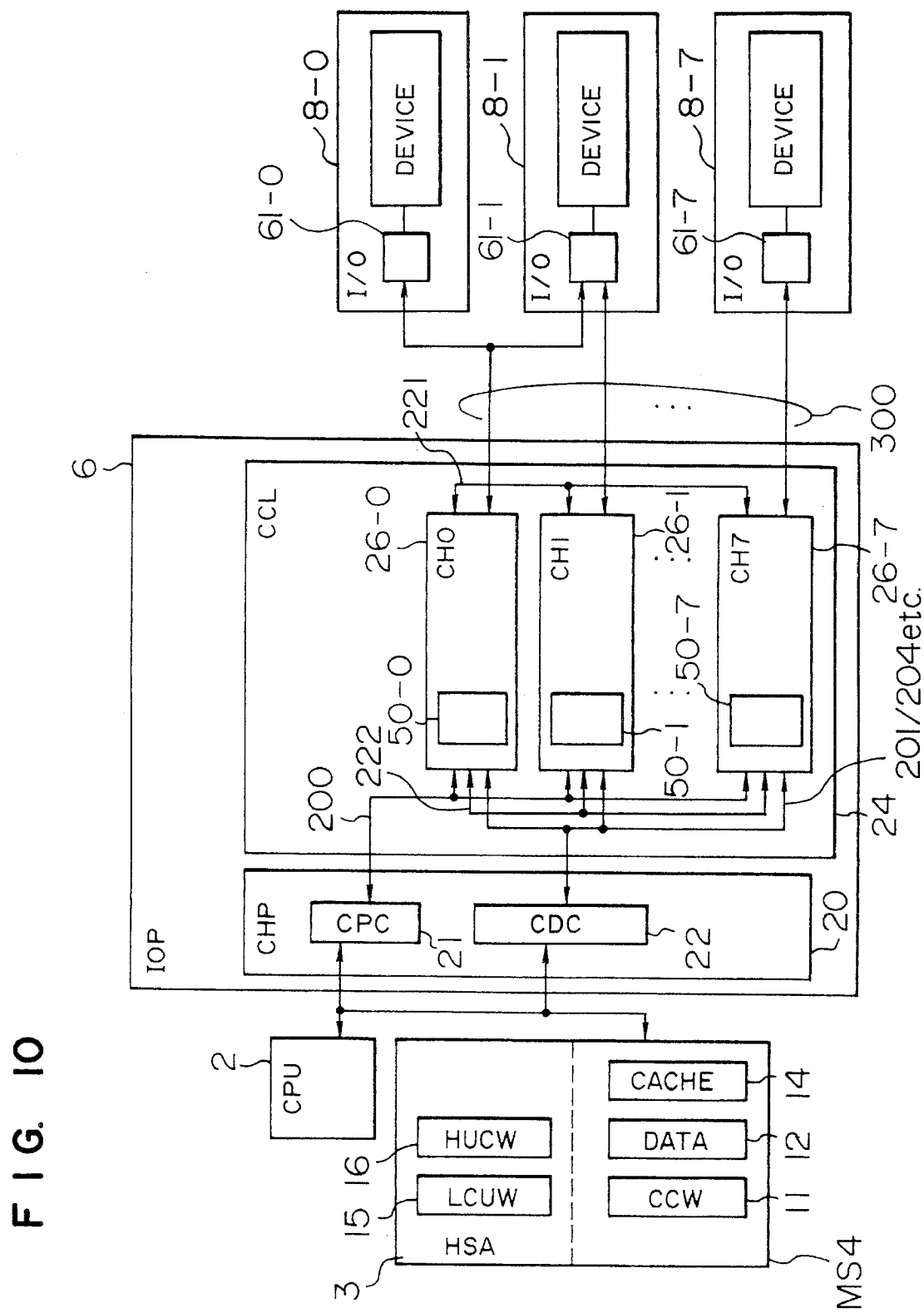
FIG. 10 is a diagram showing an outlined construction of another embodiment of the present invention.

The control section 50 of each of the channels started by the CPC 21 through a line 200 requests through a line 201 that the CDC 22 fetch a channel command word (CCW) on the MS 4. The control section 50 within each of the channels judges whether the fetched CCW is chained with the succeeding CCW or not, depending on the control information of the CCW and whether data transfer should be started or not, depending on the transfer count 121 thereof (Step 508). When it should be started, an assigned count of data bytes to be transferred and a data transfer start address are calculated. 1 FIG. 8 shows a flow chart indicating the operation for judging whether the transfer should be started and calculating the assigned counts and the data transfer start addresses. In the same figure the channel number (0–7) for identifying the 8 parallelized channels is represented by n and the data transfer count designated by the CCW is represented by a variable d (bytes).

At first, the data transfer count d designated by the CCW is checked to know whether it is greater than 2 kilo-bytes (kB)(Step 600). If d<2 kB, an assigned count CC to each channel is equal to "0" (Step 601). If d≧2,048 in Step 600, CC=256×m B. Here, m is the greatest integer, which doesn't exceed d÷2,048. Thereafter (d−2,048×m→d) is effected (Step 602).

Next it is judged whether 256×(n+1)≧d>256×n or not (Step 603). If 256×n≧d, nothing is effected. If 256× n<d≧256×(n+1), (CC+d−256×n→CC) is effected (Step 604). If d>256 (n+1), (CC+256→CC) is effected (Step 605). In this way, the number of data bytes to be transferred by each of the channels is determined and assigned to the variable CC by using the channel number n (n=0–7). The control section 50 sets the value of the variable CC in the transfer counter 60.

After the processing described above, it is judged that CC≠0 (Step 606). If CC≠0, the transfer is started (Step 607), while if CC=0, the transfer is not started (Step 608). In the case where the transfer is to be started, the transfer start address is changed to (data address designated by CCW)+ 256×n (Step 609). The amount of data to be transferred and the transfer start address are calculated for each of the channels by the process described above.

Returning again to FIG. 3, the processing within a channel will be explained. The control section 50 sets the assigned count (CC) and the transfer start address calculated according to the operation described above in the transfer counter 60 and the BAR 20, respectively. For example, if a transfer count of 32 kB is designated by the CCW, since the number of bytes of the data to be transferred is 4 kB for the channel CH0, the assigned count is 4,096 and this value is set at the transfer counter 60 for the channel CH0. Further, since n=0 for the channel CH0, the transfer start address is identical to that designated by the CCW.

Next the control section 50 sets values at an increment register 32 and a block number register 34. How many blocks are to be transferred successively by one channel is determined (in this example, one data block corresponds to 32 bytes) and a value smaller than that thus determined by "1" is set in the register 34. In the present embodiment, since 256 bytes are transferred successively, "(256÷32)−1=7" is set in the register 34. The value set in the register 34 is set in the block counter 33 through a selector 37. When 256 bytes would have been transferred successively, the register 32 gives an address increment value for designating an address of data of 256 bytes to be next transferred succeedingly. Since it is necessary to designate a value incremented by (256 bytes×8=2 kB), the address increment value is "2,048−(256−32)=1,824 bytes". However, since the BAR 20 designates an address in units of blocks, the value actually set in the increment register 32 is 1,824÷32=57.

The control section 50 starts the transfer control section 70 through a line 203. The transfer control section 70 designates an address for the buffer (CBS) 30. Then, the section 70 outputs the address held in the BAR 27 and a read out request to the CDC 22. The CDC 22 reads out one data block from the MS 4 according to the address from the BAR 20 and stores it in the designated address of the CBS 30. The CBS 30 has a capacity of 2 kB of 32 bytes×64 blocks. The transfer control section 70 is informed of this storage of the data block by the CBS 30. The data transfer is started in this way. When the data transfer is started, data is exchanged between the CBS 30 and the MS 4 through the cache 14 in units of 32-byte blocks. Although the write processing (in the case where data of the MS 4 are transferred to the auxiliary storage device 8) will be explained below, the read processing can be effected similarly.

At first, when the transfer control section 70 knows that the CBS 30 has stored one data block through a line 204, a count down signal is outputted to the block counter 33 and the value of the counter 33 is decremented by "1". When the value of the counter 33 is not "0", a value of the increment register 31, "1" is selected by the selector 35 and supplied to the adder 36. The value of the BAR 27 is also supplied to the adder. As a result, the value of the BAR 20 is updated by "1". The address thus updated is outputted to the CDC 22 for the transfer of the next data block. The register 31 stores the address increment value for transferring successive 256 bytes. That is, "1" is set at the register 31 and the value of the BAR 27 is counted-up by "1" by the adder 36, so long as the value of the counter 33 is not "0". When the transfer control section 70 is informed of the storage of the data block in the CBS 30, it updates the write address for the CBS 30 to prepare for the succeeding data block. The transfer control section 70 reads out sequentially data blocks from the CBS 30 while updating the read address of the CBS 30. Data thus read out is converted into serial optical signals by a serial/parallel converter 80 and an opto-electric converter 81 and transferred to the I/O device 8 through the optical fiber set 300. In this way data blocks having been stored in successive addresses of the MS 4 are transferred to the I/O device 8. In the I/O device 8, data of 256 bytes received through each of the channel ports 61-i is stored on one of the faces of the buffer 66 by the control circuit 65. The next data is stored on the other face of the buffer 66. The control circuit 67 reads out the data from the alternate faces of the buffer 66 while reconstructing the arrangement of the data block and stores it in the storage unit 68.

When the value of the counter 33 comes to "0", the selector 35 selects a value of the register 32. As the result, the value of the BAR 27 is increased by "+57", and taking it into account together with addition results based on "1" from the register 31 up to that time, an address displaced from the address initially set by 32×(7+57)=2,048 bytes is set at the BAR 27. At the same time a value of the register 34 is selected by the selector 37 and the value of the counter 33 is set again at "7". In this way data of the next 2 kB is further transferred.

The content of the transfer counter 60 is decremented by "32" for transfer of every data block. When the transfer counter 60 informs the transfer control section 70 that the count is "0", the transfer control section 70 stops the data transfer through the line 206 and then informs the control section 50 of the termination of the data transfer through a line 203. However, (the number of data blocks)÷32 may be set in the counter 60, similar to the BAR 27. In this case, the count of the counter 60 is decremented one by one.

Figure 9A:
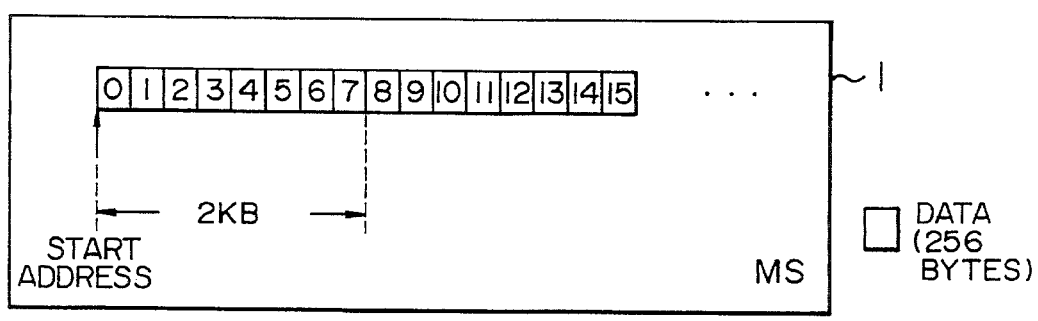
FIGS. 9A and 9B are schematical diagrams indicating a method for dividing data used in the embodiment.
Figure 9B:
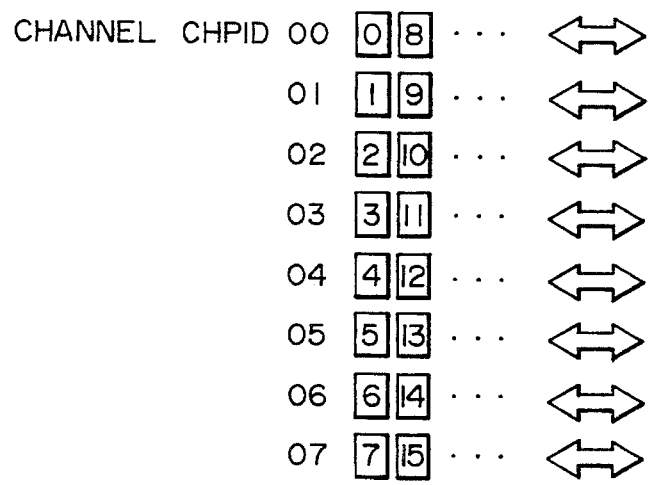

The aspect of the data division by the channels described above is summarized in FIGS. 9A and 9B. That is, in the present embodiment, data is transferred in parallel in units of 256 (=32×8) bytes per channel through 8 channels, i.e., 2 kB in one set. Consequently, each of the channels transfers 256 bytes once, and the transfer data is stored at addresses different from each other by 2 kB on the MS 4. In FIG. 9A, each of the data sets 0, 1, . . . , whose addresses are successive, indicates data of 256 bytes. These data sets are successive on the MS 4, as indicated in the figure. In order to transfer them in parallel through 8 channels CHPID00–07, data is transferred under a rule that the channel CHPID00 transfers data sets 0, 8, . . . ; the channel CHPID01 transfers data sets 1, 9, . . . ; and so forth.

When normally terminating the above processing for the CCW, the control section 50 of each channel sets a CCW termination flag 41, corresponding to the channel itself disposed within the representative channel CH0, to "1" through a line 222. After the setting of the CCW termination flag, the control sections 50 of the channels other than the representative channel wait for the start of the succeeding processing. After having set the corresponding CCW termination flag, the control section 50 of the representative channel CH0 supervises or monitors the CCW termination flags 41 through a line 207 and waits until all flags are set to "1", i.e., that data transfer is terminated at all the channels. When all the flags are set to "1", if the CCW is chained with the succeeding CCW, the control section 50 of the representative channel CH0 starts again the remaining 7 channels through a line 221. At the same time it resets all the CCW termination flags 41 to "0". Each of the started channels fetches the succeeding CCW through the CDC 22 and the operation described above is repeated. If the command chain with the succeeding CCW is not indicated, the control section 50 of the representative channel CH0 informs the CPC 21 of the termination. When being informed of the termination by all the channels CH0–CH7, the CPC 21 issues an interrupt to the CPU 2.

Since the operation of each of the channels in the case where the parallelization bit is "0", i.e. in the case of the separate mode, is almost identical to that described above, only the differences therefrom will be explained. In the case where a specific channel is made active, after specified successive data blocks have been transferred as described previously, the specific channel informs the CPC 2 of the termination without setting the CCW termination flag 41.

There may be a case where data transfer from the I/O device 8 is requested according to a user program. In this case a read request is transferred to the I/O device 8 by use of CCW(s) and read processing is effected by the succeeding CCW in the same way as that described previously. Further, also in the case where an interrupt is issued to the CPU 2 from the I/O device 8, processing is effected similarly.

As described above, according to the present invention, a channel or channels to be started by the CPC 21 are selected according to the parallelization bit within the LCUW and connection information and it is possible to operate each channel in parallel or separately. The formats of, for example, the SSCH instruction and CCW, are described in "IBM ESA/390 Principles of Operation (SA - 7201)" pp. 14-13–14-14, 15-25, published by IBM Corporation in the US.

Although in the above embodiment it is supposed that the number of channels operated in parallel is 8, it is not always necessary to restrict it thereto. Further, the number of bytes to be successively transferred by one channel is not restricted to 256, but it may be an arbitrary value. In this case the number of bytes may be set at the same time as the connection information is set in the LCUW. The number of bytes is read out by the CPC to be informed to the control section 50. In this way the address calculation can be effected only by replacing "256" by "32×k". Further it may be sufficient to set "k–1" in the register 34 and "{32×k×8 ch–(32×k)+32}÷32=7k+1" in the register 32. In this case, the data is transferred by all the channels in a unit of 32×k×8 bytes.

As clearly seen from the above explanation, according to the present invention, a plurality of channels are operated in parallel only by commanding data transfer with one channel command word to execute the data transfer corresponding to that command. For example, in the case where n channels are operated simultaneously and "32×k (k being a positive integer)" bytes are to be transferred by every channel, i.e. data is to be transferred in parallel in units of "32×k×n bytes" in total, each of the channels accesses "32×k bytes" in a discrete manner, the addresses thereof being displaced from each other by "32×k×n bytes". This access is made possible by selecting suitably an increment value for addresses, at which data is to be fetched/stored for every channel, from the 2 increment registers described above.

Further, there is a representative channel among the parallelized channels and it is the representative channel that has the CCW termination flag corresponding to each of the channels. When the processing of one channel command word is terminated, the flag stated above corresponding to the channel is set to "1" and the channel waits without starting the processing of the succeeding channel command word. When the flags of all the parallelized channels are set to "1", the representative channel informs the other channels of a restarting of the processing. In this way it is possible to synchronize the operation within the parallelized channels in a unit of the channel command word.

Moreover, the CHP refers to the LCUW, when the channel is selected. At this time, it is judged by referring to the value of the parallelization flag bit that the registered channels are parallelized and all the channel paths are started. In this way it is possible to operate simultaneously all the parallelized channels. When the flag is not "1", this means that the channel is not parallelized and therefore each of these channels can be operated independently from each other similarly to heretofore.

Furthermore, since a plurality of channels are constructed so as to be operated in parallel according to an indication of one channel command word, it is possible to form a channel apparatus having a high throughput. Since it is sufficient for this purpose that it is provided e.g. with a block number counter, two increment registers, flag bits corresponding to different parallelized channels, a parallelization bit in a table, in which channel paths are registered, etc., the construction is simple.

What is claimed is:

1. A method for transferring data between a main storage device and an I/O device through a channel apparatus disposed therebetween, said channel apparatus having a plurality of channels connected in parallel to said I/O device, said main storage device being accessed in units of a data block including bytes of a predetermined number, comprising the steps of:

determining within each channel a number of data blocks to be transferred through each of said channels, in units of data block sets in response to an input/output command, each of said data block sets including successive data blocks of a predetermined number;

determining within each channel addresses of said main storage device, corresponding to a respective data block set, for each channel; and transferring data between said main storage device and said I/O device through said channels in an interleave manner in units of said data block sets in accordance with said determined addresses;

wherein the step of determining addresses comprises:

determining in each channel a start address for that channel based on an address designated by said input/output command, the number of data blocks in each data block set and the number of the channel;

updating in each channel said start address based on the number of data blocks transferred while successive data blocks of a data block set is transferred; and updating in each channel said updated address for the channel based on the predetermined number of data blocks in said data block set and the number of channels when said data block set is transferred.

2. A method according to claim 1, further comprising the steps of:

setting a termination flag by each of said channels, when said each channel has completed the transfer of the data blocks of the determined number; and issuing from a predetermined channel a notice indicating that execution of said input/output command has been completely terminated, when said one predetermined channel determines that termination flags for all the channels are set.

3. A method according to claim 1, further comprising the step of:

predetermining the number of data blocks in said data block set by a user.

4. A method for transferring data between a main storage device and an I/O device through a channel apparatus disposed therebetween, said channel apparatus having a plurality of channels, comprising the steps of:

setting a mode flag indicating one of a separate mode and a parallel mode;

specifying channels connected with said I/O device;

referring to said mode flag in response to an input/output command to determine whether the separate mode or the parallel mode is set;

making active the specified channels in the parallel mode and a specific one among the specified channels in the separate mode;

determining an amount of data to be transferred through each of the active channels from an amount of data designated by a CCW in the parallel mode and an amount of data to be transferred through said active channel from the designated amount of data in the separate mode; and transferring the data of said determined amount through each active channel between said main storage device and said I/O device.

5. A method according to claim 4, further comprising the steps of:

setting a termination flag within a representative one of the active channels by each of the active channels, when each active channel has completed the transfer of the determined amount of data in the parallel mode; and said representative channel making active the other active channels to execute another CCW in response to setting of the flags of all the active channels in the parallel mode, when the CCW is chained with the other CCW.

6. A method according to claim 5, further comprising the step of:

issuing a notice indicating that the execution of the CCW has been terminated in response to setting of the flags of the active channels in the parallel mode, when the CCW is not chained with another CCW.

7. A method according to claim 4, wherein said step of transferring the data includes transferring said determined amount of data in units of data block sets; and said method further comprises the step of specifying a number of bytes of said data block set by a user.

8. A channel apparatus disposed between a main storage device and an I/O device for transferring data therebetween, said main storage device being accessed in units of a data block including bytes of a predetermined number, comprising a plurality of channels, wherein each of said channels comprises:

transfer amount determining means for determining an amount of data to be transferred through the channel in units of data block sets in response to a CCW which is common to said channels, said data block set including successive data blocks of a predetermined number;

address determining means for determining addresses of said main storage device corresponding to the data to be transferred by the channel in an interleave manner based on the predetermined number of data blocks of said data block set and the number of channels; and means for transferring data in parallel with the other channels in units of data block sets between said main storage device and said I/O device in accordance with the determined addresses;

wherein said address determining means comprises:

holding means for holding an access address determined from an address designated by a CCW, said number of data blocks of said data block set, and the number of channels; and means for updating the access address based on the number of transferred data blocks while the data blocks of one data block set are transferred; and means for updating the updated address based on the predetermined number of data blocks of said data block set, after said data block set has been transferred.

9. A channel apparatus according to claim 8, wherein one of said plurality of channels operating as a representative channel further comprises:

termination flags disposed for said plurality of channels;

means for monitoring whether all of said termination flags are set or not; and means for determining that data transfer commanded by the CCW is terminated, when it is detected that all of said termination flags are set; and each of said channels further comprises:

means for setting the corresponding termination flag within said representative channel, when the channel completes the transfer of the determined amount of data.

10. A channel apparatus according to claim 9, wherein said representative channel further comprises:

means for determining whether the CCW is chained with another CCW or not;

means for starting the other channels to execute the other CCW, when it is determined that the CCW is chained with the other CCW and that all of said termination flags are set; and means for generating a notice indicative of the termination of the CCW, when it is judged that the CCW is not chained with any CCW and that all of said termination flags are set.

11. A computer system comprising:

a CPU;

a main storage device connected with said CPU;

an I/O device; and a channel apparatus having a plurality of channels connected to said CPU, said main storage device, and said I/O device, for transferring data between said main storage device and said I/O device in response to a transfer command from said CPU, wherein said main storage device stores a table for storing mode data indicating one of a separate mode and a parallel mode and connection information indicating the channels connected with said I/O device, CCWs and the data to be transferred;

said CPU stores said mode data and said connection information in said table in response to designation from a user and issues the transfer command, said channel apparatus comprises:

means for referring to said table in response to said transfer command to determine which of a separate mode and a parallel mode is selected, and making active all of the channels in the parallel mode and a specific one among the channels indicated by said connection information in the separate mode; and wherein each of said plurality of channels comprises:

means for determining an amount of data to be transferred through the channel in units of data block sets from a data amount designated in the CCW in the parallel mode, a data amount to be transferred through the specific channel being determined by the designation in the CCW in the separate mode, means for generating addresses of said main storage device based on an address designated in the CCW, a number of data blocks of data block set, and the number of channels in the parallel mode, based on the address designated in the CCW in the separate mode, and means for transferring data of the amount determined for every active channel between said main storage device and said I/O device in accordance with the generated addresses.

12. A computer system according to claim 11, wherein one of said plurality of channels operating as a representative channel further comprises:

termination flags disposed for said plurality of channels;

means for monitoring whether all of said termination flags are set or not; and means for judging that data transfer designated by the CCW is terminated, when it is detected that all of said termination flags have been set; and each of said channels further comprises:

means for setting the corresponding termination flag in said representative channel, when each of the channels has completed the transfer of the determined amount of data.

13. A computer system according to claim 11, wherein said representative channel further comprises:

means for judging whether the CCW is chained with another CCW or not;

means for starting the other channels to execute the other CCW, when it is judged that the CCW is chained with the other CCW and it is detected that all of said termination flags have been set; and means for generating a notice indicating the termination of the CCW, when it is judged that the CCW is not chained with any CCW and it is detected that all of said termination flags have been set.

14. A computer system according to claim 11, wherein said I/O device includes:

a buffer for storing data temporarily;

a port connected with each of the channels; and means for reconstructing the data stored in said buffer through said port in the parallel mode.

* * * * *